United States Patent [19]
Lu et al.

[11] Patent Number: 5,526,196
[45] Date of Patent: Jun. 11, 1996

[54] LIGHT FILTER APPARATUS OF AN IMAGE SCANNING DEVICE

[75] Inventors: Yu-Yang Lu; Der-Roung Shyu, both of Kweishan, Taiwan

[73] Assignee: Acer Peripherals, Inc., Taiwan

[21] Appl. No.: 286,883

[22] Filed: Aug. 5, 1994

[51] Int. Cl.⁶ .............................. G02B 5/22; G02B 7/02
[52] U.S. Cl. .................. 359/892; 359/891; 359/889; 359/811; 359/819
[58] Field of Search ..................... 359/891, 892, 359/234, 236, 889, 201, 203, 226, 555, 556, 557, 885, 611, 811, 819, 831

[56] References Cited

U.S. PATENT DOCUMENTS 5,430,589  7/1995  Moir et al. ..................... 360/97.02

FOREIGN PATENT DOCUMENTS 149980  8/1990  Taiwan .

*Primary Examiner*—Paul M. Dzierzynski
*Assistant Examiner*—Mohammad Y. Sikder
*Attorney, Agent, or Firm*—Christensen, O'Connor, Johnson & Kindness

[57] ABSTRACT

A light filter apparatus of an image scanning device is provided. The light filter apparatus is a frame of a spindle-like shape. The frame comprises a connecting sleeve at both ends and a plurality of axial-symmetrical sub-frames each of which accommodates a light filter film. The sub-frame has two inwardly converging ends connected with the connecting sleeves respectively. The sub-frame has a slot for receiving the light filter film.

4 Claims, 2 Drawing Sheets

W1 > W2

5,526,196

LIGHT FILTER APPARATUS OF AN IMAGE SCANNING DEVICE

TECHNICAL FIELD OF THE INVENTION

The present invention relates in general to a light filter apparatus of an image scanning device and, in particular, to a light filter apparatus which is a frame of a spindle-like shape.

BACKGROUND OF THE INVENTION

With the growing need of processing image information with the computer equipments, the image scanning device is gaining in popularity.

To scan an image, a light is first directed onto an image information to be scanned. The reflect light from the image information is then arranged to pass a light filter apparatus, which typically is rotating in a high speed, for chromatic filtration of the reflect light. One single chromatic primary color, e.g. Red, Green, or Blue, passing through the light filter apparatus at any moment is then fed to a charged coupled device (CCD) through a lens. Many different conventional types of light filter apparatus which are discussed and summarized in the issued Patent (Publication No. 149980) of Taiwan, Republic of China, the entire contents of which are herein expressly incorporated by reference.

However, not to mention other shortcomings, for the manufacture of the light filter apparatus protected by the mentioned R.O.C. patent, a rather complex injection die comprising at least six slide blocks is required when the apparatus is to be used in a color scanning device.

SUMMARY OF THE INVENTION

To the shortcomings of the conventional approaches recited in Taiwan patent No. 149980 and above, the present invention provides a light filter apparatus of a spindle-like shape. The moment of inertia for rotational movement of the invention is smaller than the conventional light filter apparatus and therefore may rotate much stably under a smaller driving power. Furthermore, the invention may by manufactured by a much simple injection die and therefore costs less.

The light filter apparatus provided is a frame of a spindle-like shape. The frame comprises a connecting sleeve at both ends and a plurality of axial-symmetrical sub-frames each of which accommodates a light filter film. The sub-frame has two inwardly converging ends connected with the connecting sleeves respectively. The sub-frame has a slot for receiving the light filter film.

The utility and characteristic of the invention may be further understood with the following recitation on the invention accompanied by the appended drawings.

DETAILED DESCRIPTION OF THE INVENTION

Figure 1B:
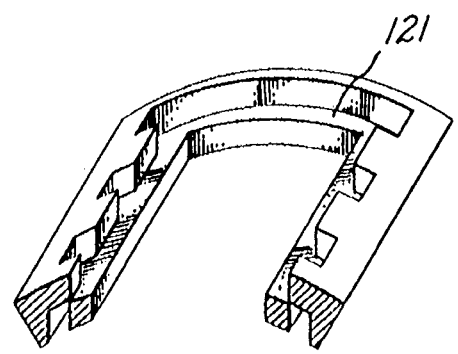
FIG. 1(B) is an enlarged view of the sub frame of FIG. 1(A).
Figure 1A:
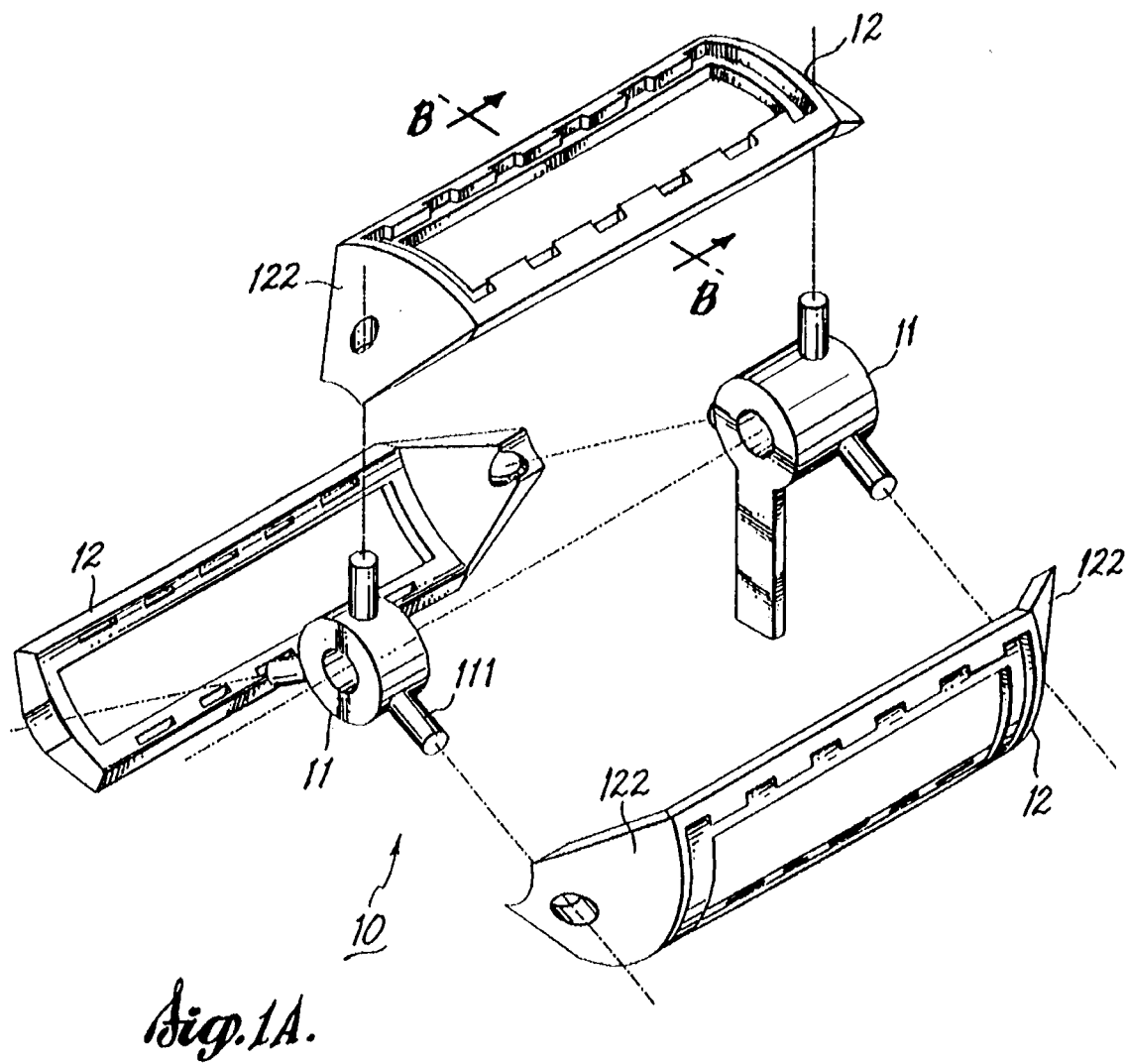
FIG. 1(A) shows an explosion view of the members of the invention.

As shown in FIG. 1(A), the light filter apparatus of the invention is a frame 10 of a spindle-like shape. Each end of the frame 10 has a connecting sleeve 11.

The frame 10 further comprises a plurality of axial-symmetrical sub-frames 12 each of which positions and accommodates a light filter film within a slot 121, as shown in FIG. 1(B), therein.

Figure 3:
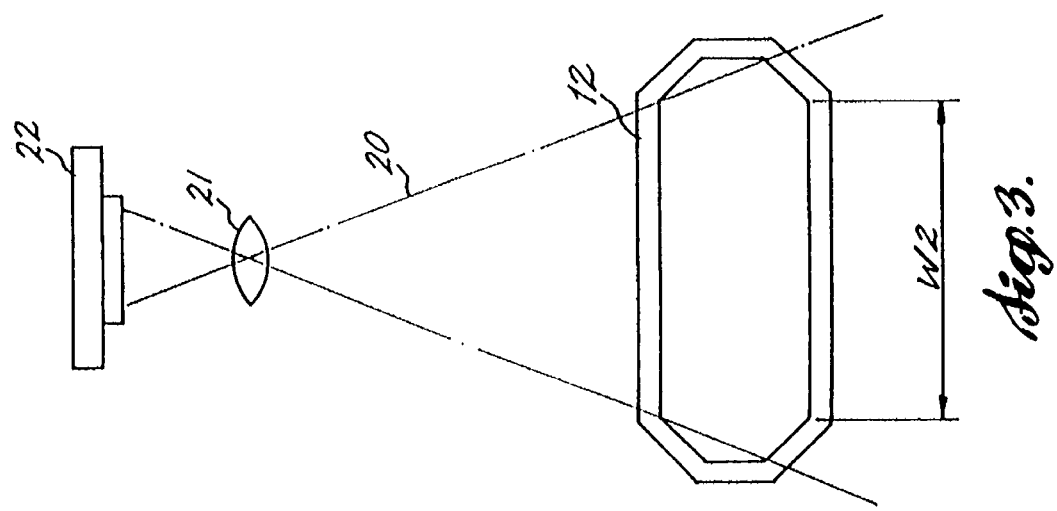
FIG. 3 is a schematic diagram showing the reflect light passes through the light filter apparatus of the invention.

The two ends 122 of the sub-frame 12, as shown in FIG. 1 and FIG. 3, converges inwardly and connected to the connecting sleeves 11 respectively to form the frame 10.

The sub-frames 12 and the connecting sleeves 11 may be connected with each other to form the light filter apparatus integrally or by a assembly process which is implied in FIG. 1. When the sub-frame 12 and the connecting sleeve 11 are injected individually by independent processes and are assembled together to form the light filter apparatus, the converging end 122 of the preferred embodiment of the invention provides a hole for the insertion of a corresponding key 111 of the connecting sleeve 11. Since the form or shape of the sub-frames 12 are all the same, only one simple injection die is needed to manufacture the sub-frames. The light filter apparatus can also be manufactured by a single injection process to form the frame 10 integrally. However, a complex injection die consisting of six or more slide blocks is required.

Figure 4:
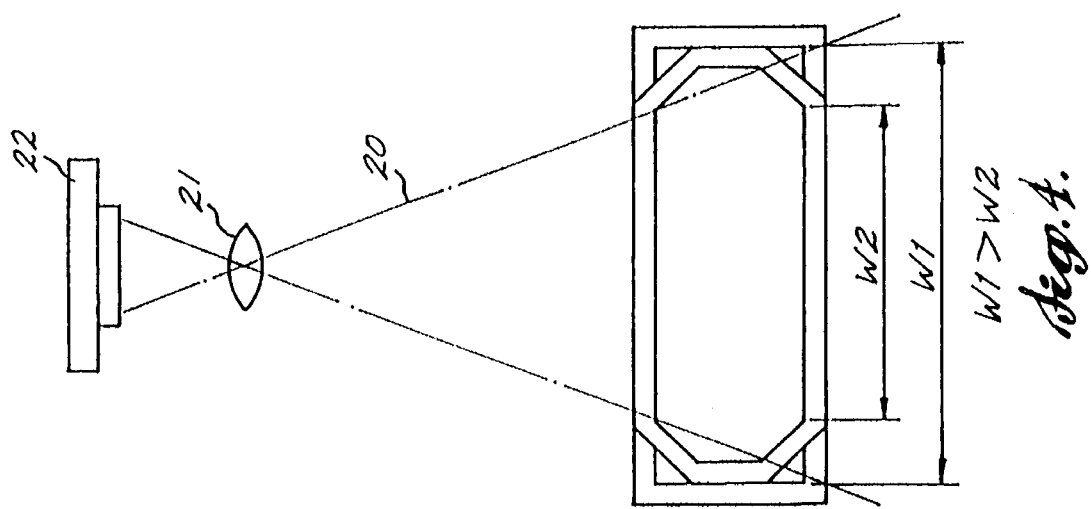
FIG. 4 is the comparison of FIGS. 3 and 2.
Figure 2:
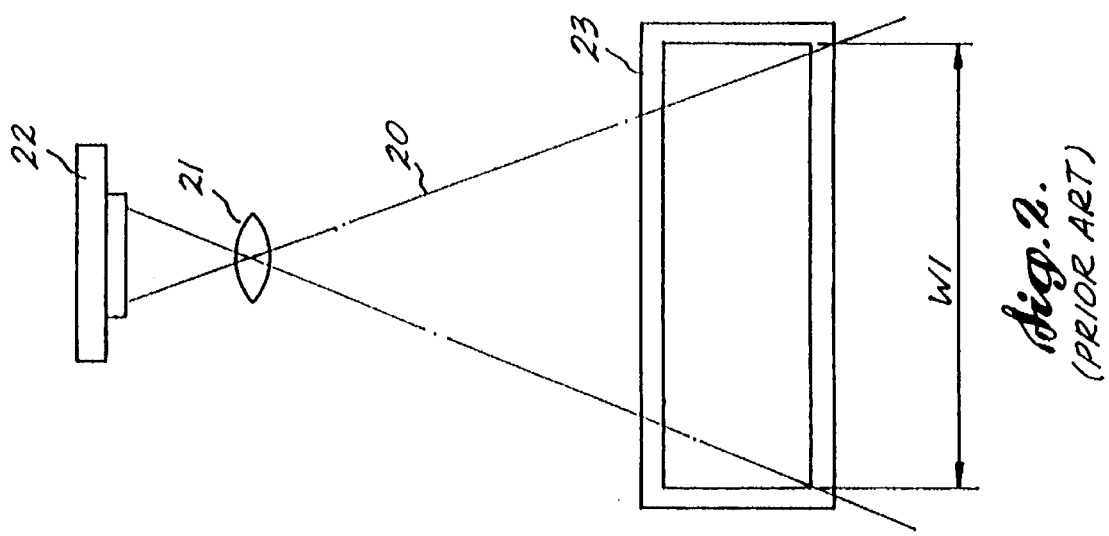
FIG. 2 is a schematic diagram showing the reflect light passes through the conventional light filter apparatus of cylindrical type.

A schematic diagram showing the reflect light 20 passes through the light filter apparatus 23 of the conventional cylindrical type is disclosed in FIG. 2. When the required minimum length of the light filter film is W2, the required length of the apparatus is W1 as shown. A schematic diagram showing the reflect light 20 passes through the light filter apparatus 10 of the invention is disclosed in FIG. 3, which shows a length of W2 is required instead under the same condition. As compared in FIG. 4, the conventional approach needs a frame of W1 length and the invention, without blocking the light at all, only needs a length of W2 which is smaller than W1. In other words, the end portions of the light filter apparatus 23 as shown in FIG. 2 are wasted compared to the present invention. The device 21 is a lens and the device 22 is a charged coupled device.

Furthermore, due to the converging effect of the ends 122 of the sub-frame 12, the moment of inertia for rotation motion and the overall weight of the frame 10 are smaller than those of apparatus of FIG. 2 respectively. To drive the light filter apparatus of the invention, a smaller power is needed therefore.

The detailed description of the invention recited above is only for illustrative, rather than limiting purpose. Therefore, not only the above preferred embodiment of the invention, but the equivalence thereof are intended scope of the protection of the invention which is defined by the following claims.

What is claimed is:

1. A light filter apparatus of an image scanning device, said light filter apparatus being a frame of a spindle-like shape, the frame having a connecting sleeve at both ends and having a plurality of axial-symmetrical sub-frames each of which accommodates a light filter film, said sub-frame having two inwardly converging ends connected with said connecting sleeves.

2. The apparatus recited as claim 1, wherein said spindle-like frame is formed integrally.

3. The apparatus recited as claim 1, wherein the converging end of said sub-frame having a hole for the insertion of a corresponding key of said connecting sleeve.

4. The apparatus recited as claim 1, wherein said sub-frame having a slot for receiving the light filter film.

* * * * *